United States Patent
Nissov et al.

(10) Patent No.: US 6,751,012 B1
(45) Date of Patent: Jun. 15, 2004

(54) METHOD AND APPARATUS FOR MEASURING NOISE FIGURE IN OPTICAL AMPLIFIERS

(75) Inventors: Morten Nissov, Ocean Township, NJ (US); Yanjie Chai, Marlboro, NJ (US); Gregory M. Wolter, Oakhurst, NJ (US); Michael A. Mills, Freehold, NJ (US); George T. Harvey, Princeton, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 261 days.

(21) Appl. No.: 10/022,140

(22) Filed: Dec. 13, 2001

Related U.S. Application Data

(60) Provisional application No. 60/255,587, filed on Dec. 14, 2000.

(51) Int. Cl.$^7$ .................. H01S 3/00; G01N 21/00; H04B 10/08
(52) U.S. Cl. ............... 359/337; 359/177; 356/306
(58) Field of Search ................ 359/337, 341.1, 359/177; 372/23; 356/945, 949, 303, 306, 320

(56) References Cited

U.S. PATENT DOCUMENTS

| | | | | |
|---|---|---|---|---|
| 5,034,678 | A | * 7/1991 | Eichen et al. | 324/76.36 |
| 5,095,281 | A | 3/1992 | Tzeng | 330/2 |
| 5,696,707 | A | * 12/1997 | Hentschel et al. | 702/69 |
| 5,825,530 | A | 10/1998 | Leckel et al. | 359/333 |
| 6,226,117 | B1 | 5/2001 | Hentschel | 359/337 |
| 6,275,328 | B1 | * 8/2001 | Parry et al. | 359/337 |
| 6,388,806 | B1 | * 5/2002 | Freeman et al. | 359/341.3 |
| 6,496,611 | B1 | * 12/2002 | Ohtsuka | 385/11 |
| 6,580,550 | B1 | * 6/2003 | Kosaka et al. | 359/337.1 |
| 6,602,002 | B1 | * 8/2003 | Srivastava et al. | 398/113 |
| 6,631,025 | B2 | * 10/2003 | Islam et al. | 359/334 |

FOREIGN PATENT DOCUMENTS

EP  000794599 A2  * 9/1997

OTHER PUBLICATIONS

Lam et al, " A configurable wavelength demultiplexer using periodic filter chains", 1977 Digest of IEEE/LEOS, pp. 78–79, Abstract Only Herewith.*

Wysocki, PF, "Bradband amplifier measurements techniques", Optical Amplifiers And Their Application, Jul. 9, 2000, vol. 44, pp. 253–259.*

* cited by examiner

*Primary Examiner*—Nelson Moskowitz

(57) ABSTRACT

An apparatus for measuring the noise figure in optical amplifiers employed for large bandwidth applications such as dense wavelength division multiplexing systems. A booster amplifier coupled to a light source increases the average power associated with a plurality of optical channels. A periodic filter is coupled to the booster amplifier to reflect noise between each of the optical channels across the predetermined bandwidth. An amplifier under test is coupled to the periodic filter and the noise figure associated with the amplifier under test is measured.

11 Claims, 2 Drawing Sheets

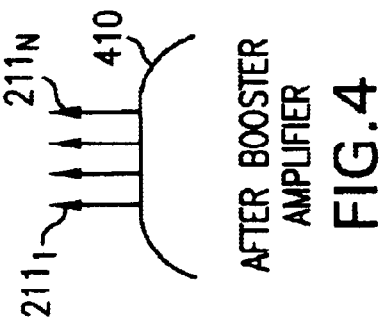
FIG.3 WDM SOURCE
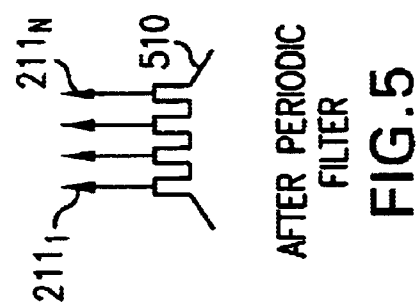
FIG.4 AFTER BOOSTER AMPLIFIER
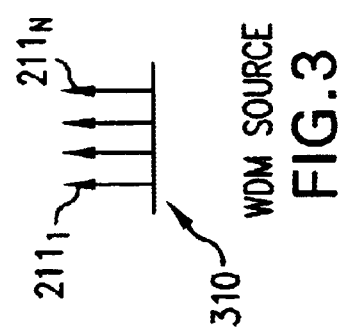
FIG.5 AFTER PERIODIC FILTER

METHOD AND APPARATUS FOR MEASURING NOISE FIGURE IN OPTICAL AMPLIFIERS

CROSS REFERENCE TO RELATED APPLICATION

The present application claims the benefit of U.S. Provisional Application Serial No. 60/255,587 filed Dec. 14, 2000, entitled "Method and Apparatus for Measuring Noise Figure in Optical Amplifiers", the teachings of which are incorporated herein by reference.

TECHNICAL FIELD

The present invention relates to an apparatus for evaluating the characteristics of an optical fiber amplifier and more particularly to an apparatus for measuring the noise figure in optical amplifiers employed for large bandwidth applications such as dense wavelength division multiplexing systems.

BACKGROUND

Wavelength division multiplexing (WDM) optical communication systems employ optical amplifiers to increase the power of optical channels across a gain bandwidth. The gain ($P_{out}/P_{in}$) of an optical amplifier is measured by the ratio of the output power ($P_{out}$) of a signal to its input power ($P_{IN}$). Amplifier gain efficiency measures the gain as a function of pump power in dB/mW. Obtaining accurate gain characteristics is subject, however, to amplifier noise. The dominant source of such noise is amplified spontaneous emission (ASE) which is produced by the spontaneous emission of photons in the active region of the amplifier. Because these amplifiers are used in long-distance transmission, such as submarine communication systems, they must have gain characteristics that are relatively flat and wide in addition to possessing low noise and high efficiency. This makes evaluation of the wavelength characteristics of an optical amplifier important to system design and implementation.

A typical testing configuration for an optical amplifier is illustrated in FIG. 1. An optical amplifier 20 is disposed between light source 10 and an optical spectrum analyzer (OSA) 30. Light from source 10 is amplified by amplifier 20 and measured by OSA 30. Because optical amplifiers suffer from ASE, noise is measured by the OSA before and after the amplifier. In this manner, a noise density is obtained for the source which is subtracted from the noise density measured after the amplifier to determine the noise associated with the amplifier (i.e. source subtraction). This method works well for low power, narrow-band amplifiers. As the power and bandwidth increases, the noise level from the input signal loading the amplifier likewise increases. However, a drawback associated with this testing configuration occurs when the input noise increases to the level of the noise generated by the amplifier. In this instance, it becomes difficult to separate out the noise generated by the amplifier from the noise associated with the input optical signal.

Accordingly, there is a need for an optical testing apparatus and method that overcomes the deficiencies of the prior art by measuring the noise figure in optical amplifiers employed for large bandwidth applications.

SUMMARY OF THE INVENTION

The present invention provides an apparatus for measuring the noise figure in optical amplifiers employed for large bandwidth applications such as dense wavelength division multiplexing systems. The testing apparatus provides a device under test with optical signals having the appropriate noise and power levels for the operation of such a device under test.

An optical amplifier evaluating apparatus consistent with the invention includes a light source that supplies a plurality of WDM optical channels across a predetermined bandwidth; a booster amplifier coupled to the light source is configured to increase the average power associated with each of the optical channels, the amplifier produces broadband noise across the predetermined bandwidth; a periodic filter is coupled to the booster amplifier where the filter has a periodic attenuation (e.g., reflection or absorption) characteristic configured to attenuate noise between each of the optical channels across the predetermined bandwidth; and a device under test coupled to the periodic filter.

In another aspect of the present invention, there is provided a method of testing an optical amplifier that includes the steps of outputting light signals corresponding to WDM optical channels from a light source; amplifying the average power of the light signals; filtering the amplified light signals such that noise between the optical channels is suppressed; supplying the filtered optical signals to a device under test; and measuring a noise figure associated with the device under test.

BRIEF DESCRIPTION OF THE DRAWINGS

For a better understanding of the present invention, together with other objects, features and advantages, reference should be made to the following detailed description which should be read in conjunction with the following figures wherein like numerals represent like parts:

FIG. 3 graphically illustrates optical signals outputted from a WDM source shown in FIG. 2 in accordance with the present invention;

FIG. 4 graphically illustrates broadband noise produced by the booster amplifier shown in FIG. 2 in accordance with the present invention; and FIG. 5 graphically illustrates optical signals after filtering by the periodic filter shown in FIG. 2 in accordance with the present invention.

DETAILED DESCRIPTION OF THE INVENTION

The above drawbacks and disadvantages are overcome by employing a periodic optical filter to suppress the noise between loading tones to enable source subtraction noise figure measurements on wide band, high power amplifiers.

Figure 1:
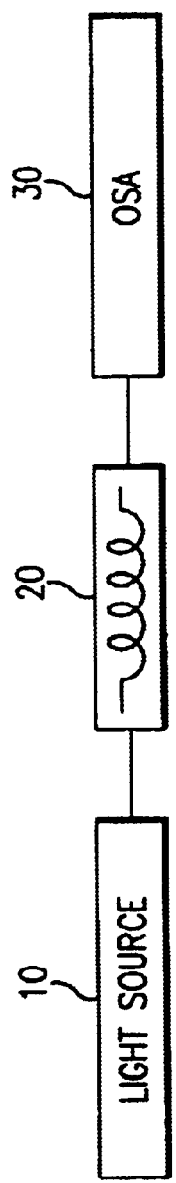
FIG. 1 is a schematic illustration of a typical testing configuration for an optical amplifier.
Figure 2:
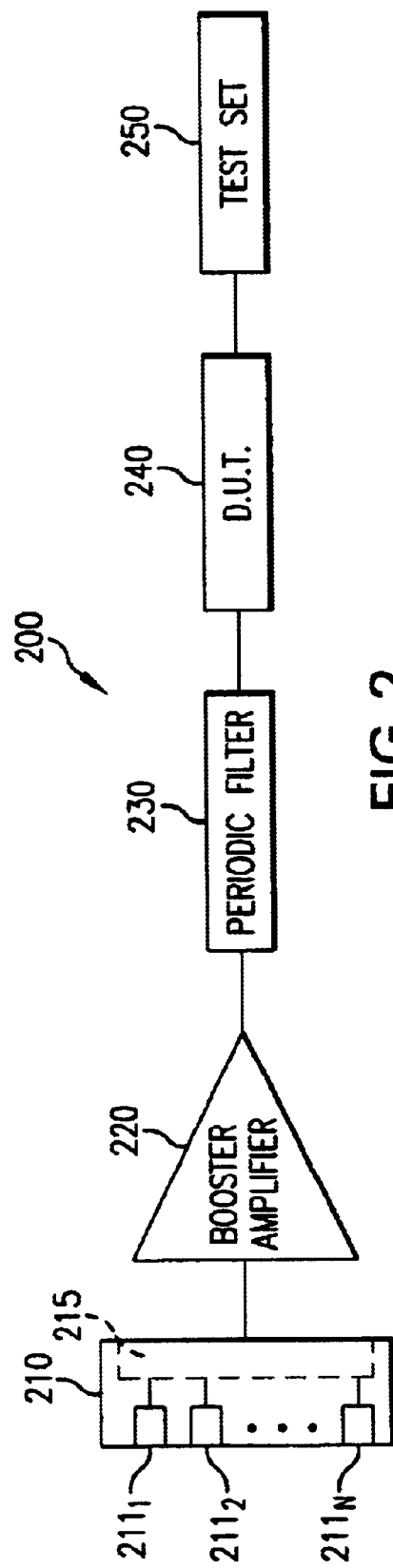
FIG. 2 is a schematic illustration of a test measurement system in accordance with the present invention.

FIG. 2 is a schematic illustration of a measurement system 200 in accordance with the present invention. System 200 includes a WDM source 210, a booster amplifier 220, a periodic filter 230, a device under test (DUT) 240 and a test set (or analyzer) 250. This type of configuration may be used where the DUT has a very low noise figure approaching the noise figure of source 210.

WDM source 210 may be, for example, a plurality of distributed feedback (DFB) lasers $211_1 \ldots 211_N$ each tuned to a respective wavelength associated with particular WDM channels. By way of example, when simulating a WDM system having sixty four channels, sixty four DFB lasers $211_1 \ldots 211_{64}$ may be configured to represent the sixty four WDM channels. FIG. 3 graphically illustrates the signals $211_1 \ldots 211_N$ outputted from WDM source 210 and supplied to booster amplifier 220. As can be seen, source 210 provides noise 310 across the various optical channels. Additionally, WDM source 210 may also include an optical multiplexer 215 to multiplex sources $211_1 \ldots 211_N$ and output the combined signal to booster amplifier 220.

Booster amplifier 220 optically communicates with WDM source 210 and is used to increase the average power of the signals received from source 210 to provide the proper input power level of the signals supplied to the amplifier under test. The expression "optically communicates" as used herein, refers to any connection, coupling, link, or the like, by which optical signals carried by one optical system element are imparted to the "communicating" element. Such "optically communicating" devices are not necessarily directly connected to one another, but may be separated by intermediate optical components or devices. Booster amplifier may be, for example, an erbium doped fiber amplifier, Raman amplifier, etc. that provides 10 dB of gain. Although booster amplifier increases the average power of the WDM output signals from source 210, it also adds broadband noise shown graphically at 410 in FIG. 4. This noise component is added across optical signals $211_1 \ldots 211_N$ and dominates noise measurements performed on the device under test. Accordingly, a periodic filter 230 that has a periodic transmission (or attenuation) characteristic is employed to reduce the noise produced by booster amplifier 220 between the optical signals $211_1 \ldots 211_N$. An example of such a periodic filter is an Optical Slicer™ filter commercially available from Chorum Technologies. Similar periodic filters are commercially available from JDS Uniphase Corporation, Oplink Communications, Inc., etc. and may also be employed in the present configuration. FIG. 5 graphically illustrates optical signals or channels $211_1 \ldots 211_N$ after filtering by periodic filter 230. As can be seen, the noise component 510 between each of the channels is reduced. Accordingly, the periodic filter transmits the optical signals needed to properly set the operating point of the amplifier under test while suppressing the noise between the tones.

Periodic filter 230 is coupled to a Device Under Test (DUT) 240 which may be, for example, an optical amplifier. The DUT is coupled to a test set 250 which may be for example an OSA, additional cascaded amplifiers, or other components. The filtered signal from periodic filter 230 is supplied to DUT 240 where, as noted above, the booster amplifier noise is reduced between the channels.

By way of example, an amplifier was tested using the apparatus in accordance with the present invention. The amplifier under test was configured with a 38 nm bandwidth, 6 dBm input power and 13 dB of gain. The amplifier was tested first without periodic filter 230 (the filter used was JDS Fitel FS50. The deviation of the noise figure measurement was obtained.

The present invention discloses a test configuration that provides for accurately measuring the noise generated by an amplifier under test. A periodic filter is coupled to a booster amplifier to filter-out unwanted ASE generated by the booster amplifier such that the ASE generated by the amplifier under test may be accurately measured.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention.

What is claimed is:

1. An optical amplifier evaluating apparatus comprising:
   a light source supplying a plurality of WDM optical channels across a predetermined bandwidth, each of said channels at a respective wavelength;
   a booster amplifier coupled to said light source, said amplifier configured to increase the average power associated with each of said optical channels, said amplifier producing broadband noise across said predetermined bandwidth;
   a periodic filter coupled to said booster amplifier, said filter having a periodic attenuation characteristic configured to attenuate noise between each of said channels across said predetermined bandwidth; and
   an amplifier under test coupled to said periodic filter.

2. The apparatus of claim 1 further comprising a test set coupled to said device under test.

3. The apparatus of claim 1 wherein said light source further comprises an optical multiplexer configured to combine said plurality of optical channels.

4. The apparatus of claim 2, wherein said test set is an optical spectrum analyzer.

5. The apparatus of claim 1 wherein said booster amplifier is an erbium doped optical amplifier.

6. The apparatus of claim 1 wherein said booster amplifier is a Raman amplifier.

7. An optical amplifier evaluating apparatus comprising:
   a light source supplying a plurality of WDM optical channels across a predetermined bandwidth, each of said channels at a respective wavelength;
   a periodic optical filter optically communicating with said source, said filter having a periodic attenuation characteristic configured to attenuate noise between each of said channels across said predetermined bandwidth; and
   an amplifier under test coupled to said periodic filter.

8. An optical test apparatus comprising:
   a light source supplying a plurality of WDM optical channels across a predetermined bandwidth, each of said channels at a respective wavelength;
   a booster amplifier coupled to said light source, said amplifier configured to increase the average power associated with each of said optical channels, said amplifier producing broadband noise across said predetermined bandwidth;
   a periodic filter coupled to said booster amplifier, said filter having a periodic reflectivity characteristic configured to reflect noise between each of said channels across said predetermined bandwidth; and
   a device under test coupled to said periodic filter, said device under test configured to receive input signals, from said periodic filter, at predetermined power and noise levels particularly associated with the operation of said device under test.

9. A method for testing an optical amplifier comprising the steps of:
    outputting light signals corresponding to WDM optical channels from a light source;
    amplifying the average power of said light signals;
    filtering said amplified light signals such that noise between said optical channels is suppressed;
    supplying said filtered optical signals to a device under test; and
    measuring a noise figure associated with said device under test.

10. The method in accordance with claim 9 wherein said device under test is an optical amplifier.

11. The method in accordance with claim 9 further comprising the step of:
    multiplexing said light signals.

* * * * *